Patented Feb. 7, 1950

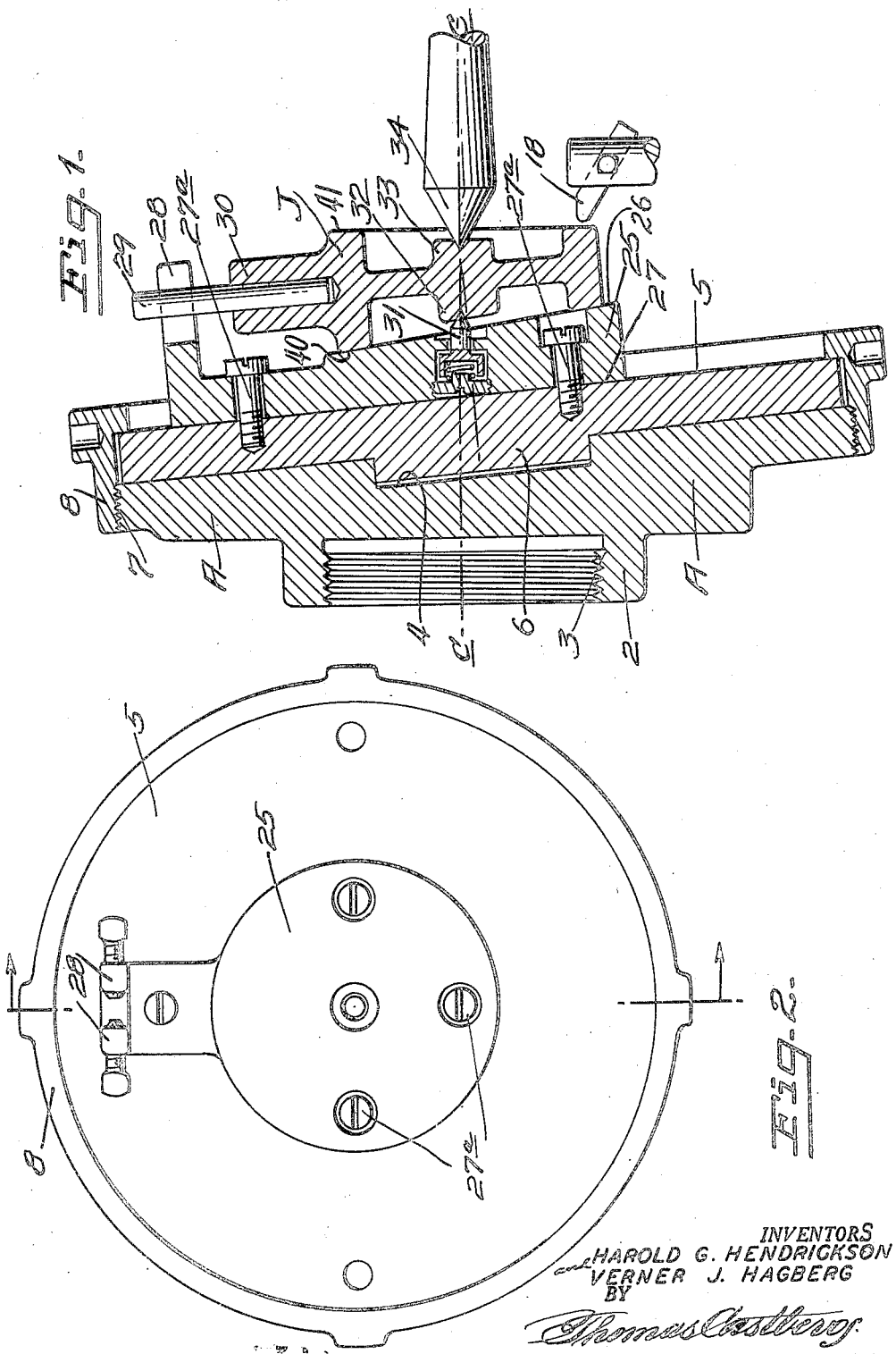

2,496,533

UNITED STATES PATENT OFFICE 2,496,533

FIXTURE FOR LATHE TURNING OF ANGULARLY DISPOSED SURFACES

Harold G. Hendrickson, Daly City, and Verner J. Hagberg, San Francisco, Calif., assignors to M. Greenberg's Sons, San Francisco, Calif., a partnership Original application July 26, 1943, Serial No. 496,224, now Patent No. 2,415,590, dated February 11, 1947. Divided and this application December 17, 1946, Serial No. 716,802

2 Claims. (Cl. 82—40)

This invention relates to a fixture whereby the angularly opposed faces of a gate valve wedge may be rapidly and accurately turned off and finished in an ordinary machine lathe. The present application is a division of our application entitled "Fixture for lathe turning of angularly disposed surfaces," now Patent No. 2,415,590, issued February 11, 1947.

A standard gate valve comprises a valve housing having an inlet and an outlet formed therein, between which are disposed two inter-spaced angularly opposed seats, which co-operate with a wedge or valve proper to form a closure between the inlet and the outlet.

The machining of a valve wedge of this character is a difficult and time-consuming job. It requires a skilled machinist or lathe-hand, and even so, the work performed is costly, as considerable time is required to set up the work in the chuck of a lathe. Two setting up operations are required to machine the valve wedge, and each setting up operation must be carefully performed if accurate results are to be obtained. But even with the greatest care, it is usually necessary to apply bluing to the opposite valve faces, and then resort to hand scraping to remove high spots, etc., before proper seating of the valve wedge with relation to the respective seats results.

The object of the present invention is to provide a fixture whereby the angularly opposed faces of a valve wedge may be rapidly and accurately turned off and machined in an ordinary machine lathe; to provide a fixture in which the setting up operation of the valve wedge is reduced to a minimum of time and accuracy at the same time assured; and further, to provide a fixture which requires only one setting up operation of the valve wedge when machining the opposed angular faces of the wedge.

The fixture is shown by way of illustration in the accompanying drawings in which Figure 1 is a section showing the fixture equipped to receive and secure the valve wedge when it is to be machined; and Figure 2 is a front view of Figure 1, but showing the wedge or valve removed.

Referring to the drawings in detail, A indicates in general a head member on the rear face of which is found a hub 2, said hub being interiorly threaded as indicated at 3, to permit the head to be secured to and driven by the spindle of a machine lathe. The forward face of the head is disposed on an angle of 5 degrees with relation to a vertical line or a line disposed at right angles to the longitudinal axis of the hub 2 or the lathe spindle to which the head is attached. A circular recess is formed in the forward face as indicated at 4, which forms a center 6 for a turntable 5, also disposed on an angle of 5 degrees. The peripheral edge of the head is threaded as at 7, to receive a clamping ring 8 which engages the peripheral edge of the turntable 5 to normally secure it against rotation as will hereinafter be described.

The fixture is designed for machining the opposite faces of the wedge or valve proper, as shown at J in Figure 1. To accomplish this a plate generally indicated at 25 is required. The outer face 26 of this plate is disposed on an angle of 10 degrees with relation to the inner face 27 which contacts the face of the turntable and is secured thereto by screws 27—a. A forked driving dog 28 is formed at one end of the plate and as such straddles a rod 29 temporarily inserted in the neck 30 of the valve wedge. A resiliently supported center pin 31 is carried by plate 25 and as such engages a center punched hole formed in a pad 32. A similar pad 33 is formed on the opposite face of the valve wedge and this is center punched to receive the tail stock pin 34 of the lathe. In actual practice the punch marks formed in the pads 32 and 33 should align with the longitudinal axis c—c of the spindle and the tail stock of the lathe. To insure this the punch marks may be made by placing the valve wedge J in a jig and punching them, or the punch marks or indentations may be formed in the molding and casting operation. No great accuracy is required as the only function of the tail stock pin 34 and the resilient pin 31 is to secure the valve wedge casting J against radial movement during the machining operation. In other words, no clamps and bolts are required to secure the valve wedge J to the plate 25 during the machining operation as the only force applied to the valve is a turning torque and this is transmitted through the dog 28 and the rod 29. The setting up operation is accordingly quickly accomplished as it is only necessary to place the valve against the face 26 of the plate 25 with the center punch hole in register with the resilient pin 31 and then to advance the tail stock pin to engage the opposite center punch and partially clamp the valve against the plate. Rod 29 is then passed through the fork of dog 28 and into the neck 30 of the valve and the setting up operation is completed. When the outer face of the valve wedge is machined the tail stock pin 34 is retracted, the valve wedge is reversed and the tail stock pin is again brought into engagement thereby permitting machining and finishing of the second face, when the valve wedge may be removed and the next valve wedge applied. In actual practice the angularly disposed surface presented by the head A and the turntable 5 is 5 degrees, and as the surfaces 40 and 41 of valve wedge J when machined should also be disposed on an angle of 5 degrees, it is essential that the face 26 of plate 25 be disposed on an angle of 10 degrees. By so disposing the angular surface, the outer face 41 of the valve wedge J assumes a vertical plane while being turned in the lathe and so does the surface 40 when the valve wedge is reversed, and while these and other features of the invention are more or less specifically illustrated, we wish it understood that various changes in form and proportion may be resorted to within the scope of the appended claims; similarly that the materials and finish of the several parts employed may be such as the experience and judgment of the manufacturer may dictate or varying uses may demand.

Having thus described our invention, what we claim and desire to secure by Letters Patent is:

1. A fixture of the character described comprising a head adapted to be secured to and rotated by the spindle of a lathe about the axis of said spindle, the forward surface of the head being disposed in a plane at a predetermined angle to a plane normal to said axis, a plate secured to said forward surface of the head and having an outer face disposed in a plane at twice said predetermining angle to a plane normal to said axis, a pin mounted in said plate on said axis for positioning work to be machined on the outer face of the plate, and means on the plate engageable with the work to be machined to rotate said work when the head and the plate are rotated.

2. A fixture of the character described comprising a head adapted to be secured to and rotated by the spindle of a lathe about the spindle axis, a turntable carried by the head and rotatable with respect thereto about a turntable axis intersecting said spindle axis at a predetermined angle, a plate secured to the turntable and having an outer face disposed in a plane normal to an axis at twice said predetermined angle to said spindle axis, means for positioning work to be machined on the outer face of the plate and for securing the work against radial movement, means for securing the turntable and the plate for rotation in unison with the head, and means for securing the work positioned on the plate for rotation in unison with the plate.

HAROLD G. HENDRICKSON.
VERNER J. HAGBERG.

REFERENCES CITED

The following references are of record in the file of this patent:

UNITED STATES PATENTS

| Number | Name | Date |
|---|---|---|
| 1,745,525 | Bessell | Feb. 4, 1930 |
| 1,937,240 | Odum | Nov. 28, 1933 |
| 1,979,897 | Melcher | Nov. 6, 1934 |